B. D. ALLBAUGH.
SELF ADJUSTING NUT.
APPLICATION FILED OCT. 8, 1921.
1,408,962.
Patented Mar. 7, 1922.
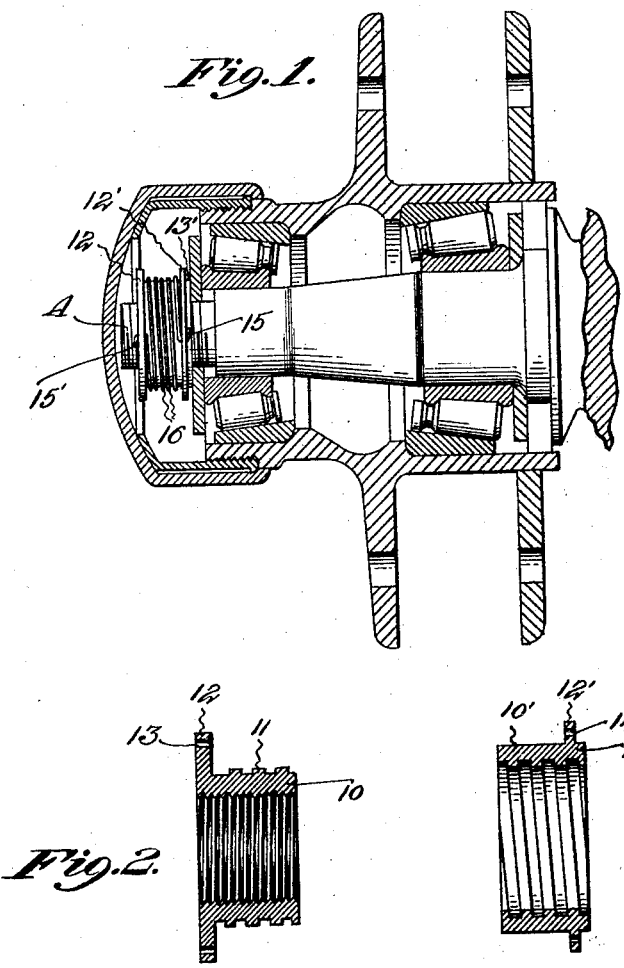
Byron D. Allbaugh
INVENTOR
BY Victor J. Evans
ATTORNEY
WITNESS:

UNITED STATES PATENT OFFICE.

BYRON D. ALLBAUGH, OF DIERKS, ARKANSAS.

SELF-ADJUSTING NUT.

1,408,962.  Specification of Letters Patent.  Patented Mar. 7, 1922.

Application filed October 8, 1921. Serial No. 506,438.

*To all whom it may concern:*

Be it known that I, BYRON D. ALLBAUGH, a citizen of the United States, residing at Dierks, in the county of Howard and State of Arkansas, have invented new and useful Improvements in Self-Adjusting Nuts, of which the following is a specification.

This invention comprehends the provision of a self adjusting nut primarily intended for use with front wheel bearings for motor vehicles, and designed to maintain a constant and uniform pressure against the bearing for the purpose of preventing wear of the latter and maintaining the front wheels in proper adjustment.

More specifically stated, the invention consists of a two-part nut, one part of which is adapted to be associated with the spindle, and the other part threaded upon the first mentioned part and having associated therewith resilient means which has a tendency to unscrew the second mentioned part so as to hold the latter against the bearing with a constant and uniform pressure for the purpose stated.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views and wherein:—

Figure 1 is a view showing the manner of using the invention.

Figure 2 is a detail view of one part of the nut in section.

Figure 3 is a similar view of the other part of the nut.

Figure 4 is a view, showing the parts operatively associated.

As above stated, the two part nut forming the subject matter of the present invention is designed for use in conjunction with the bearings of the front wheels of a motor operated vehicle, and is adapted to be arranged with relation to the bearing in a manner illustrated in Figure 1. One part of this nut which is indicated at 10 is interiorly threaded, the threads being of the same pitch as the spindle A upon which it is screwed, while the part 10 is also exteriorly threaded as at 11, these threads being preferably square and approximately six threads to an inch. The part 10 is also provided with a flange 12 having one or more openings 13 for a purpose to be presently described.

The other part 10' of the nut is interiorly threaded to accommodate the exterior threads of the part 10, upon which it is screwed in a manner illustrated in Figure 4. The part 10' is also formed with a flange 12' and a raised portion 13' which is arranged at one side of the flange 12', the flange 12' is also provided with one or more openings 14', and one of these openings receives the offset extremity 15 of a coiled spring 16, the latter surrounding the nut as a unit and having its other offset extremity 15' received by the opening of the flange 12 of the member 10. The coiled spring 16 is tensioned so as to tend to unscrew the member 10' from the member 10 when the parts are positioned in the manner illustrated in Figure 1. It is to be understood that if the spindle with which the part 10 of the nut is associated has a right hand, then the exterior threads 11 of this part of the nut is a left hand thread, and the tension of the adjusting spring 16 is in a direction to the left. If the threads of the spindle is a left hand thread, then the exterior threads 11 of the part 10 is just the reverse, and the tension of the adjusting spring is in a direction to the right. Consequently, the tension of the adjusting spring imparts an inward travel to both portions of the nut, thus holding the inner portion 10 associated with the spindle without the use of cotter pins or any other additional fastening elements, and at the same time exert a constant and uniform pressure against the other part of the nut indicated at 10'.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:—

1. The combination with a spindle, and a wheel bearing, of a self adjusting nut comprising two parts, one of said parts being threaded on the spindle, the other of said parts being threaded upon the first mentioned part and arranged in contacting engagement with said bearing, and means for automatically adjusting the second mentioned part to maintain a constant and uniform pressure against the bearing for the purpose specified.

2. The combination with a spindle, and a wheel bearing, of a self adjusting nut comprising two parts, one of said parts being threaded upon the spindle, the other of said parts being threaded upon the first mentioned part and arranged in contacting engagement with said bearing, and resilient means connecting said parts and normally tending to unscrew the second mentioned part from the first mentioned part, whereby a constant pressure is exerted against the bearing for the purpose specified.

3. As a new article of manufacture, a two part nut, one of said parts being interiorly and exteriorly threaded, the other of said parts being interiorly threaded to accommodate the exterior threads of the first mentioned part, a flange formed on each of said members, and a coiled spring surrounding said nut and having its terminals connected with said flanges, said spring having a tendency to unwind the second mentioned member from the first mentioned member as and for the purpose specified.

In testimony whereof I affix my signature.

BYRON D. ALLBAUGH.